United States Patent

Davis et al.

[11] Patent Number: 6,141,784
[45] Date of Patent: *Oct. 31, 2000

[54] METHOD AND SYSTEM IN A DATA COMMUNICATIONS SYSTEM FOR THE RETRANSMISSION OF ONLY AN INCORRECTLY TRANSMITTED PORTION OF A DATA PACKET

[75] Inventors: Gordon Taylor Davis; Jeffrey Haskell Derby, both of Chapel Hill, N.C.

[73] Assignee: International Business Machines Corporation, Armonk, N.Y.

[ * ] Notice: This patent is subject to a terminal disclaimer.

[21] Appl. No.: 08/979,668

[22] Filed: Nov. 26, 1997

[51] Int. Cl.$^7$ .............................. G08C 25/02; H04L 1/18
[52] U.S. Cl. ........................... 714/748; 714/776; 370/473
[58] Field of Search .................... 714/748, 750, 714/749, 751, 776, 774; 370/473

[56] References Cited

U.S. PATENT DOCUMENTS

| | | | |
|---|---|---|---|
| 3,868,633 | 2/1975 | Nuese | 340/146.1 BA |
| 3,879,577 | 4/1975 | Progler | 178/23 A |
| 3,934,224 | 1/1976 | Dulaney et al. | 340/146.1 BA |
| 4,070,648 | 1/1978 | Mergenthaler et al. | 340/146.1 BE |
| 4,390,989 | 6/1983 | Pehrson | 371/22 |
| 4,488,002 | 12/1984 | Seibel | 179/2 DP |
| 4,622,682 | 11/1986 | Kumakura | 375/58 |
| 4,712,214 | 12/1987 | Meltzer et al. | 371/32 |
| 4,745,601 | 5/1988 | Diaz et al. | 370/110.1 |
| 5,394,440 | 2/1995 | Goldstein et al. | 375/265 |
| 5,408,475 | 4/1995 | Lee | 371/20.4 |
| 5,426,643 | 6/1995 | Smolinske et al. | 370/105.3 |
| 5,487,068 | 1/1996 | Smolinske et al. | 370/94.1 |
| 5,490,168 | 2/1996 | Phillips et al. | 375/224 |
| 6,049,902 | 4/2000 | Davis et al. | 714/748 |

*Primary Examiner*—Albert De Cady
*Assistant Examiner*—Samuel Lin
*Attorney, Agent, or Firm*—A. J. Dillon

[57] ABSTRACT

A method and system in a data processing system are disclosed for the retransmission of only a portion of a data packet which had originally been transmitted incorrectly. A first data link is established between a first computer system and a second computer system. In response to the establishment of the first data link, a second data link is established between the first and second computer systems, whereby the first and second data links are related. A plurality of data packets are transmitted from the first computer system to the second computer system utilizing the first data link. Each of the data packets includes a plurality of segments. A determination is made whether each of the plurality of data packets is received correctly. In response to a determination that one of the plurality of data packets is received incorrectly, a portion of the data packet which was transmitted incorrectly is determined. Only the incorrectly transmitted portion of the data packet is then retransmitted by the first computer system utilizing the second data link.

24 Claims, 6 Drawing Sheets

METHOD AND SYSTEM IN A DATA COMMUNICATIONS SYSTEM FOR THE RETRANSMISSION OF ONLY AN INCORRECTLY TRANSMITTED PORTION OF A DATA PACKET

CROSS-REFERENCE TO RELATED APPLICATIONS

The present invention is related to the subject matter of copending patent application Ser. No. 08/979,044 (U.S. Pat. No. 6,049,902) (Docket Number RA9-97-053) assigned to the assignee herein named and filed on the same date.

BACKGROUND OF THE INVENTION

1. Technical Field

The present invention relates to data processing systems and, in particular, to the retransmission of only an incorrectly transmitted portion of a data packet. Still more particularly, the present invention relates to a method and system in a data processing system for the association of an error detection identifier with each of a plurality of segments included within a transmitted data packet.

2. Description of the Related Art

Computer systems utilize modems to communicate with each other utilizing analog telecommunication lines such as a telephone network. The modem converts the digital data from the computer to an analog signal that can be transmitted on a telecommunication line and converts the analog signal received to data for the computer. Standard protocols are defined, such as the ITU V series, which describe modem operation and design in order to permit different, conforming computer systems to communicate.

One such protocol is an error detection and recovery via retransmission protocol, such as the ITU V.42 protocol. Such a protocol recovers from errors by retransmitting incorrectly received data packets. Error correction protocols are defined to overcome data communication errors typically due to noise on the telecommunication line. The protocol defines procedures to be taken when a transmitted packet of data is received in error.

For example, when a receiving system receives a packet in error, a standard reject procedure (REJ) requires the retransmission of all data received after the bad packet was received. Alternatively, a selective reject procedure (SREJ) requires retransmission of only the packets which were actually received in error, thus minimizing the total amount of data which must be retransmitted after an error has occurred.

Using a selective reject instead of a standard reject procedure may speed up transmission. However, problems can occur when the packet including the selective reject information is itself in error. For example, the selective reject packet may be lost during transmission. In this case, the data link must wait for a time-out recovery. This wait will have a larger negative impact on throughput than if a standard reject procedure had been used, since all data sent while waiting for the time-out will be discarded during the process of recovering from that time-out.

In known systems, after an error has occurred during the transmission of a packet, the entire packet must be retransmitted. Therefore, often there will be significantly more data which is retransmitted than was actually corrupted. For example, a 512-byte packet may have had a 32 byte burst in the middle of the packet which was in error with the remaining bytes having been received correctly. Known error correction procedures would require the entire 512-byte packet to be retransmitted.

Therefore a need exists for a method and system in a data processing system whereby only a portion of a data packet is retransmitted in response to the portion having been transmitted incorrectly.

SUMMARY OF THE INVENTION

It is therefore one object of the present invention to provide an improved data processing system.

It is another object of the present invention to provide a method and system for the retransmission of only a portion of a data packet which had been originally transmitted incorrectly.

It is yet another object of the present invention to provide a method and system in a data processing system for the association of an error detection identifier with each of a plurality of segments included within a transmitted data packet.

The foregoing objects are achieved as is now described. A method and system in a data communications system are disclosed for the retransmission of only a portion of a data packet which had originally been transmitted incorrectly. A first data link is established between a first computer system and a second computer system. In response to the establishment of the first data link, a second data link is established between the first and second computer systems, whereby the first and second data links are related. A plurality of data packets are transmitted from the first computer system to the second computer system utilizing the first data link. Each of the data packets includes a plurality of segments. A determination is made whether each of the plurality of data packets is received correctly. In response to a determination that one of the plurality of data packets is received incorrectly, a portion of the data packet which was transmitted incorrectly is determined. Only the incorrectly transmitted portion of the data packet is then retransmitted by the first computer system utilizing the second data link.

The above as well as additional objectives, features, and advantages of the illustrative embodiment will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of the preferred embodiment when read in conjunction with the accompanying drawings, wherein:

DETAILED DESCRIPTION OF PREFERRED EMBODIMENT

An exemplary embodiment of the present invention and its advantages are better understood by referring to FIGS. 1–6 of the drawings, like numerals being used for like and corresponding parts of the accompanying drawings.

Figure 1:
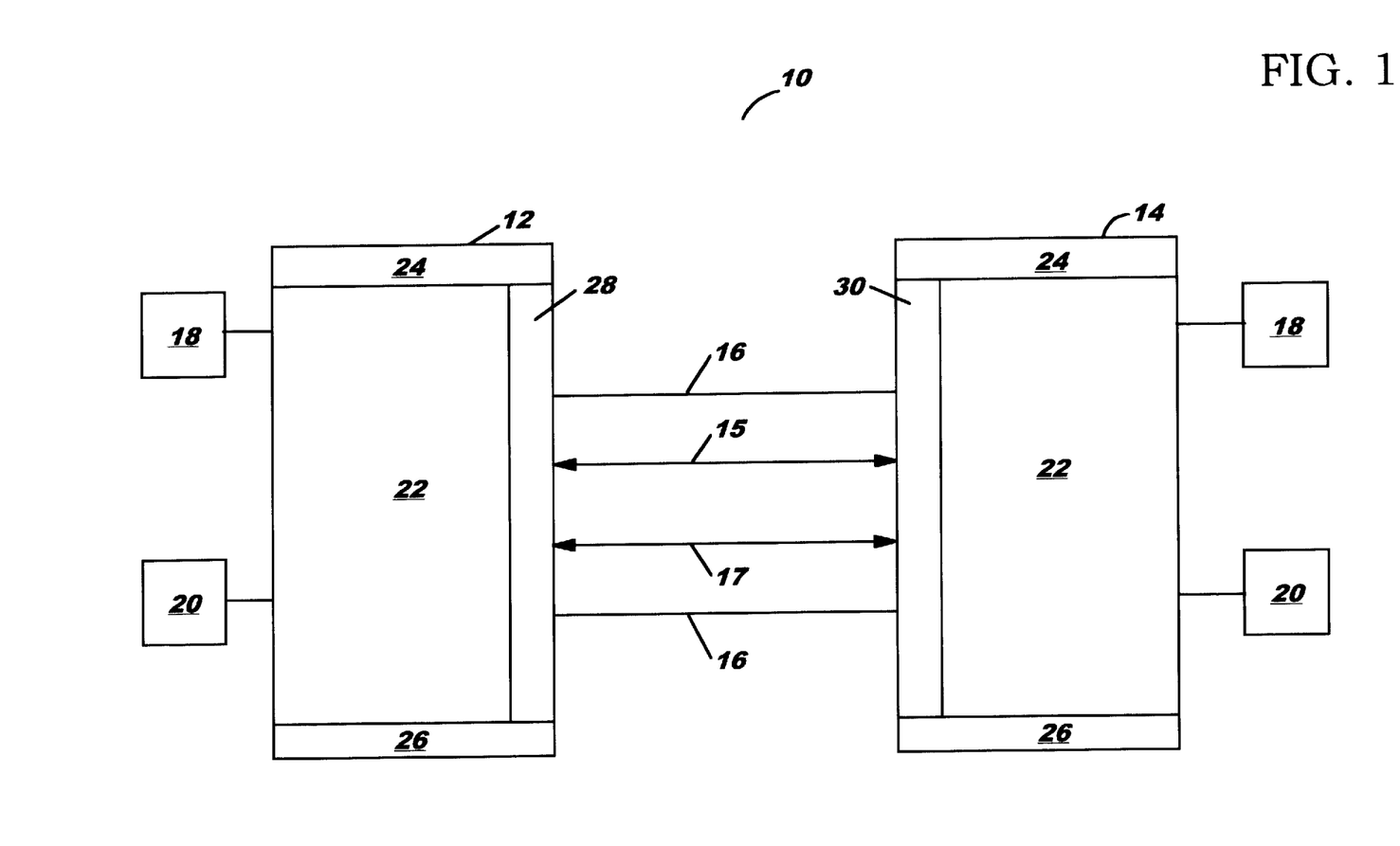
FIG. 1 depicts a high-level block diagram of a data communications system 10 including a first computer system and a second computer system which may be utilized to implement the method and system of the present invention.

FIG. 1 depicts a high-level block diagram of a data communications system 10 including a first computer system 12 and a second computer system 14 which may be utilized to implement the method and system of the present invention. In a preferred embodiment, data communications system 10 may include a plurality of computer systems 12, 14 which may be linked together utilizing a physical communication link 16. Those skilled in the art will recognize that any number of computer systems may be interconnected to permit data communication.

Physical communication link 16 includes a plurality of logical data links, or logical channels, such as data links 15 and 17. A data link includes the physical communication link as well as the protocol and any associated software necessary to implement the data link. Data links 15 and 17 are related but have separate, different logical addresses so that packets may be transmitted on one data link without interfering with packets being concurrently transmitted on the other data link. Those skilled in the art will recognize that logical data links 15 and 17 may be implemented utilizing different physical links.

As is common in such data processing systems, each individual computer may be coupled to a storage device 18 and/or a printer/output device 20. One or more such storage devices may be utilized to store the various data objects or multimedia files which may be periodically accessed, processed, and presented within data communications system 10 in accordance with the method and system of the present invention. In a manner well known in the prior art, each such data processing document or multimedia file may be stored within a storage device which may be associated with a resource manager or library service, which is responsible for maintaining and updating all resource objects associated therewith.

Each computer system 12, 14 may be implemented utilizing any suitably configured personal computer, mini computer, mainframe computer, or a computer running in a distributed network of other computers. Each computer system 12, 14 has associated therewith a CPU 22, a computer display 24 and keyboard 26. In order to permit communication between first and second computer systems 12 and 14, modems 28 and 30 are included in computer systems 12 and 14, respectively. Modems 28, 30 may be implemented utilizing voice-band modems, digital communications, such as ISDN, analog or packet cellular, satellite, or any other suitable communications device.

The present invention permits data transmission to continue on first data link 15 uninterrupted while selective rejection error correction procedures and the necessary retransmissions of data continue on second data link 17. In a preferred embodiment, computer systems 12, 14 transmit data in accordance with the ITU V.42 protocol. This standard is a well-known data communications protocol for error detection and recovery via retransmission. A more complete description of the V.42 standard may be found in *Error Correcting Procedures for DCEs Using Asynchronous to Synchronous Conversion*, Recommendation V.42, International Telecommunications Union ITU-T, Telecommunications Standardization Sector, 1988, which is incorporated herein by reference.

Data links 15 and 17 are different logical channels which may reside either on the same physical connection, such as link 16 shown in FIG. 1, or on different physical connections. Data links 15 and 17 are related. They utilize the same set of sequence numbers N(S) and N(R) for tracking transmissions and receipts of packets. Therefore, all packets transmitted by a computer system on data links 15 and 17 will be numbered using one set of sequential numbers. The transmitting and receiving computer systems may easily track each packet, including data packets as well as selective rejection packets, echo packets, and segment overlay packets. By utilizing two separate logical channels, regular data transmissions may continue on the first data link while selective rejection procedures are processed on the second data link. In this manner, when errors occur during the processing of the selective rejection packets, it is not necessary to wait for a time-out to occur in order to recover from the error.

The present invention describes a method and system whereby after an error has occurred during the transmission of a packet, only the portion of the packet in error must be retransmitted. For example, where a 512-byte packet had a 32 byte burst in the middle of the packet which was in error, only the 32 byte portion is retransmitted and replaced. The remaining bytes which were received correctly are not retransmitted.

In order to permit only the retransmission of the portion of the packet in error, each packet is divided into segments. In a preferred embodiment, each packet includes 32 segments which are 16 bytes each. However, those skilled in the art will recognize that the number of segments and any size segment may be selected as a matter of design choice.

Prior to transmission of a packet, a standard CRC (Cyclic Redundancy Check character) is calculated for the entire packet. In addition, a CRC is also calculated for each segment of the packet. Therefore, for each packet, 33 CRCs will be calculated. Each segment CRC will be stored in sequential order after calculation. By storing the segment CRCs in sequential order, an association between a segment and its segment CRC is maintained. A packet is then transmitted along with the standard CRC.

When the packet is received, the standard CRC and 32 segment CRCs are recalculated by the file transfer destination. If the received standard CRC is not the same as the calculated standard CRC, but the packet is otherwise valid, an echo packet is transmitted from the receiving computer system to the transmitting computer system. The echo packet includes each calculated CRC. The transmitting computer system then compares its stored segment CRCs with the segment CRCs which were received in the echo packet to determine which segment or segments were in error. The transmitting computer system then retransmits only those segment or segments which were in error utilizing a segment overlay packet. The receiving computer system then replaces only those segment(s) which were originally received in error.

Figure 2:
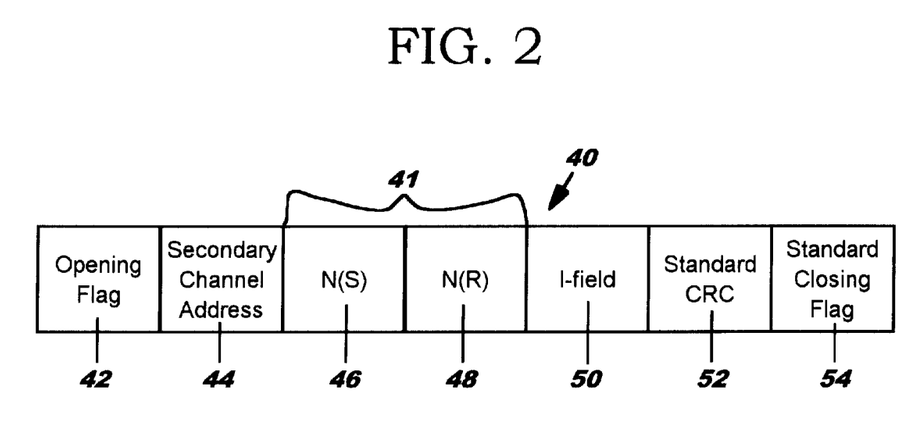
FIG. 2 illustrates a pictorial representation of an echo packet format and its associated fields in accordance with the method and system of the present invention.

FIG. 2 illustrates a pictorial representation of an echo packet format 40 and its associated fields in accordance with the method and system of the present invention. An echo packet is transmitted from a file transfer destination, such as computer system 14, when a data packet was received in error. The echo packet includes information to be utilized to identify which segments were actually in error. Format 40 includes a plurality of fields. Field 42 is a standard opening flag field. Field 44 is a standard address field. The address of the secondary logical channel, second data link 17, is inserted into field 44 for an echo packet. Fields 46 and 48 together comprise a control field 41. Field 46 includes a number N(S). The number N(S) is the next sequence number assigned by the transmitting computer system in the sequence of numbers. Field 48 includes a number N(R). The number N(R) is the sequence number N(S) which was associated with the packet which was determined to be received in error which caused the transmission of this echo packet. Field 50 is an information field, I-field, which includes all segment CRCs which were calculated by second computer system upon receipt of the data packet. Field 52 includes the standard CRC associated and transmitted with this echo packet. Field 54 is a standard closing flag field. Format 40 resembles a standard V.42 "I" format with an address, identifying the secondary link 17, which is not a currently defined address in the standard.

Figure 3:
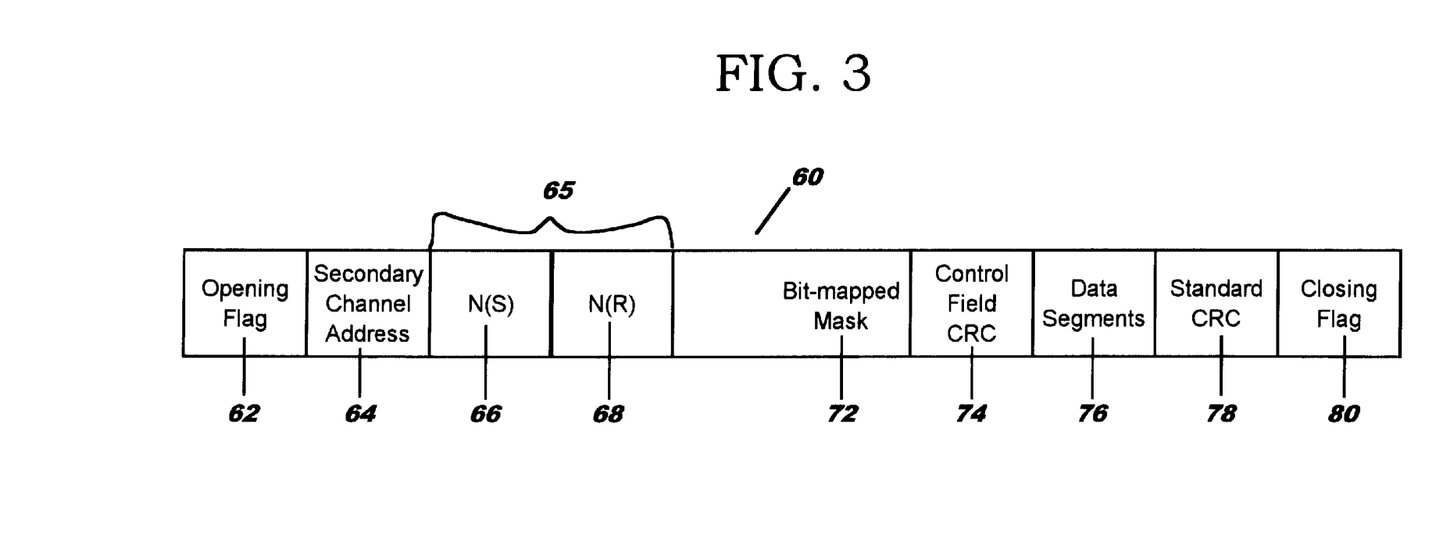
FIG. 3 depicts a pictorial representation of a segment overlay packet format and its associated fields in accordance with the method and system of the present invention.

FIG. 3 depicts a pictorial representation of a segment overlay packet format 60 and its associated fields in accordance with the method and system of the present invention. A segment overlay packet is transmitted by a file transfer source in response to a receipt of an echo packet. The segment overlay packet includes the information necessary to replace only those segments of the packet which were in error. Format 60 includes a plurality of fields. Field 62 is a standard opening flag field. Field 64 is a standard address field. The address of the secondary logical channel, second data link 17, is inserted into field 64 for a segment overlay packet. Field 65 is a control field which includes fields 66 and 68. Field 66 includes a number N(S). The number N(S) is the next sequence number assigned by the transmitting computer system in the sequence of numbers. Field 68 includes a number N(R). The number N(R) is the sequence number N(S) which was associated with the echo packet which indicated a need to retransmit this segment overlay packet. The number N(R) provides a selective acknowledgement of the received selective reject packet with N(S) set to this number. Fields 72, 74, and 76 make up the information field, or I-field, for this packet. Field 72 includes a bit-mapped mask which is utilized to indicate which segments of the original data packet were in error and which are being replaced by this segment overlay packet. Field 74 includes a control field CRC. This optional field provides additional protection of the integrity of the bit mask and control fields. Field 76 includes the actual data segments which are to be used as replacement segments for the original segments which were in error. Field 78 includes the standard CRC associated and transmitted with this segment overlay packet. Field 80 is a standard closing flag field.

Figure 4:
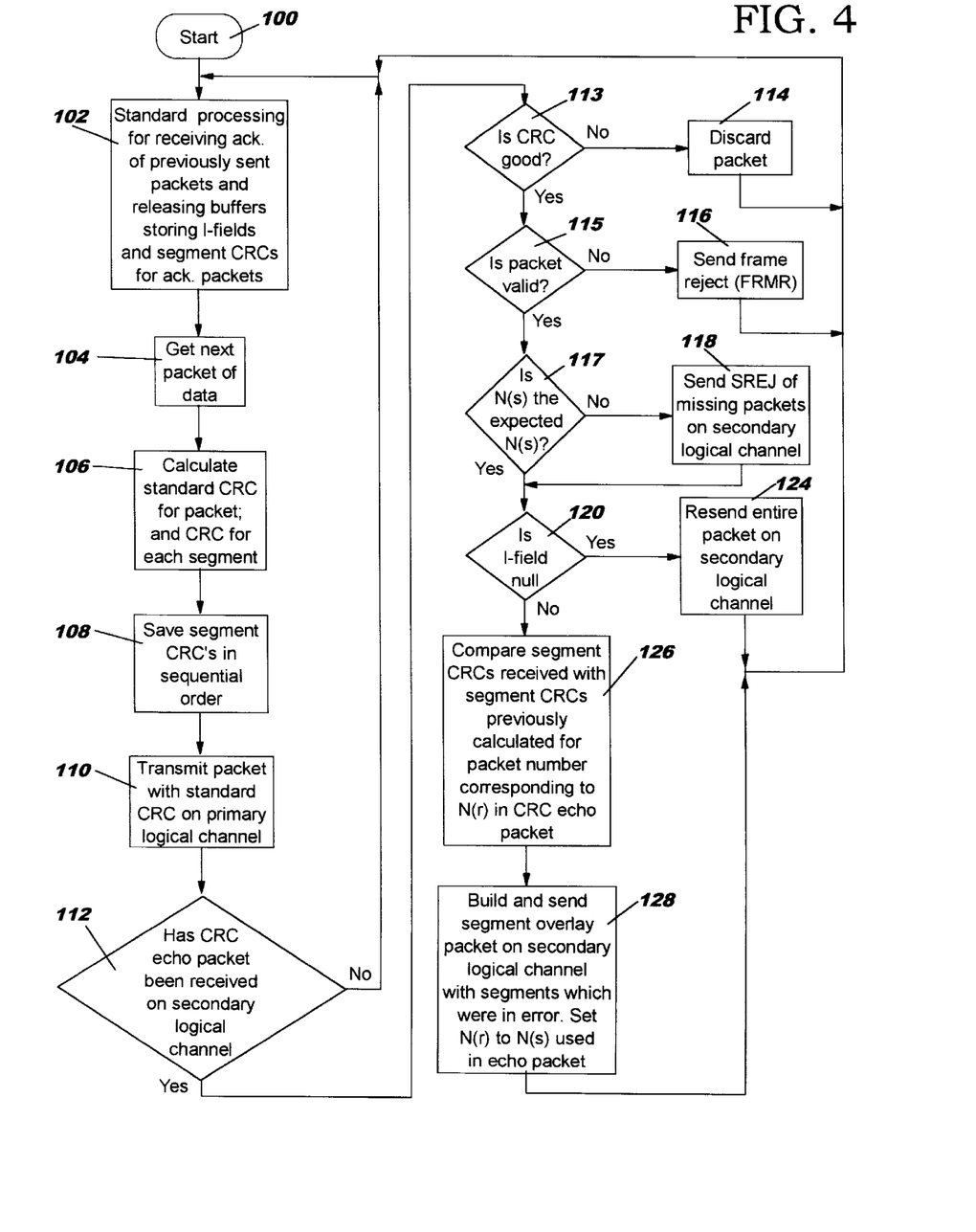
FIG. 4 illustrates a high-level flow chart depicting a file transfer source transmitting data packets utilizing a first data link, and retransmitting segment overlay data packets utilizing a second data link in accordance with the method and system of the present invention.

FIG. 4 illustrates a high-level flow chart depicting a file transfer source, for example, first computer system 12, transmitting data packets utilizing a first data link, data link 15, receiving CRC echo packets on secondary link 17, and retransmitting segment overlay data packets utilizing a second data link, data link 17, in accordance with the method and system of the present invention. The process starts as depicted at block 100 and thereafter passes to block 102 which illustrates permitting standard processing for receiving acknowledgements of previously sent packets and releasing buffers which are storing I-fields and segment CRCs for acknowledged packets. Next, block 104 depicts the getting of the next packet of data to be transmitted. Block 106, thereafter, illustrates the calculation of the standard CRC for the data packet to be transmitted as well as a separate CRC for each segment of the data packet to be transmitted. The process then passes to block 108 which depicts the saving of all calculated segment CRCs in sequential order. Each segment is associated with a segment CRC. This association is maintained by keeping the segment CRCs stored in sequence. Next, block 110 illustrates the transmission of the packet along with the standard CRC on the primary logical channel, such as data link 15.

Block 112, thereafter, illustrates a determination of whether or not an echo packet has been received by first computer system 12 on the secondary logical channel, such as data link 17. If a determination is made that an echo packet has not been received on the secondary logical channel, the process passes back to block 102. Referring again to block 112, if a determination is made that an echo packet has been received on the secondary logical channel, the process passes to block 113 which depicts a determination of whether or not the CRC is good. If a determination is made that the CRC is not good, the process passes to block 114 which illustrates the discarding of the packet. The process then passes back to block 102. Referring again to block 113, if a determination is made that the CRC is good, the process passes to block 115 which depicts a determination of whether or not the packet is valid. The packet may be declared invalid if the control field is undefined, or if the packet is too large. If a determination is made that the packet is invalid, the process passes to block 116 which illustrates the sending of a frame reject packet on the primary link. The process then passes back to block 102.

Referring again to block 115, if a determination is made that the echo packet is valid, the process passes to block 117 which depicts a determination of whether or not the sequence number associated with the packet, N(S), is the next expected number in the sequence. If a determination is made that the sequence number associated with the echo packet is not the next expected number in the sequence, the process passes to block 118 which illustrates the sending of a selective reject packet of the packets associated with the numbers missing from the sequence on the secondary logical link. The process then passes to block 120. Referring again to block 117, if a determination is made that the number associated with the packet is the next expected number in the sequence the process passes to block 120 which depicts a determination of whether or not the I-field associated with this received echo packet is null. If a determination is made that the I-field is null, the process passes to block 124 which depicts the retransmission of the entire packet on the secondary logical channel. The process then passes back to block 102.

Referring again to block 120, if a determination is made that the I-field is not null, the process passes to block 126 which illustrates a comparison of the segment CRCs received in the echo packet with the segment CRCs which were previously calculated and stored in sequential order. The comparison is made utilizing the N(R) number received in the echo packet in order to locate the packet which has already been transmitted and which was associated with an N(S) number equal to the received N(R) number. Once the correct packet is located, each saved CRC is compared to the CRC received in the echo packet. When the saved CRC does not match the echo packet's CRC for a particular segment, the segment is determined to have been in error and must be included and retransmitted in the segment overlay packet. Next, block 128 depicts the building and transmitting of a segment overlay packet on the secondary channel which includes only those segments which were in error.

Figure 5:
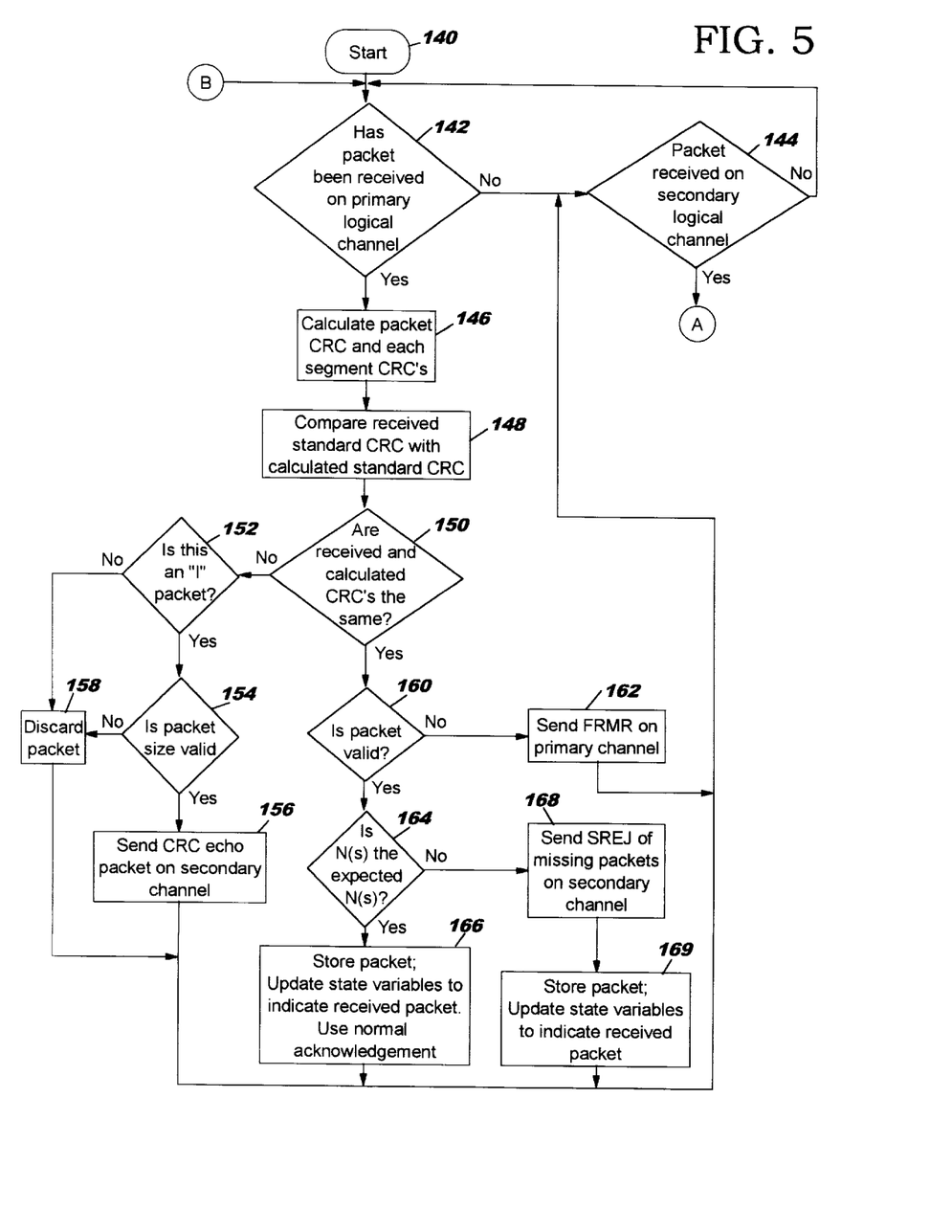
FIGS. 5 and 6 together depict a high-level flow chart illustrating a file transfer destination receiving data packets utilizing a first data link, and transmitting echo packets utilizing a second data link in accordance with the method and system of the present invention.
Figure 6A:
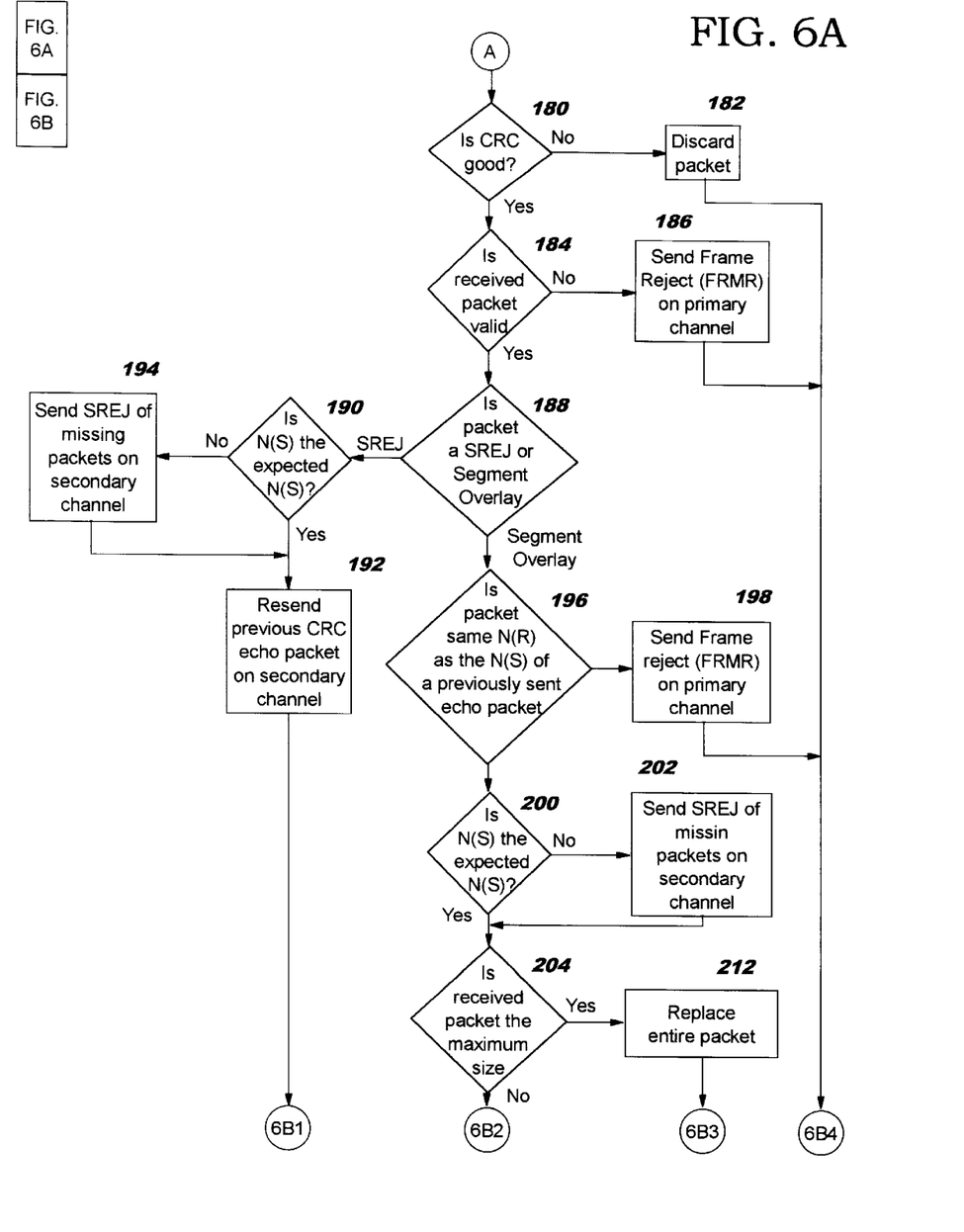
Figure 6B:
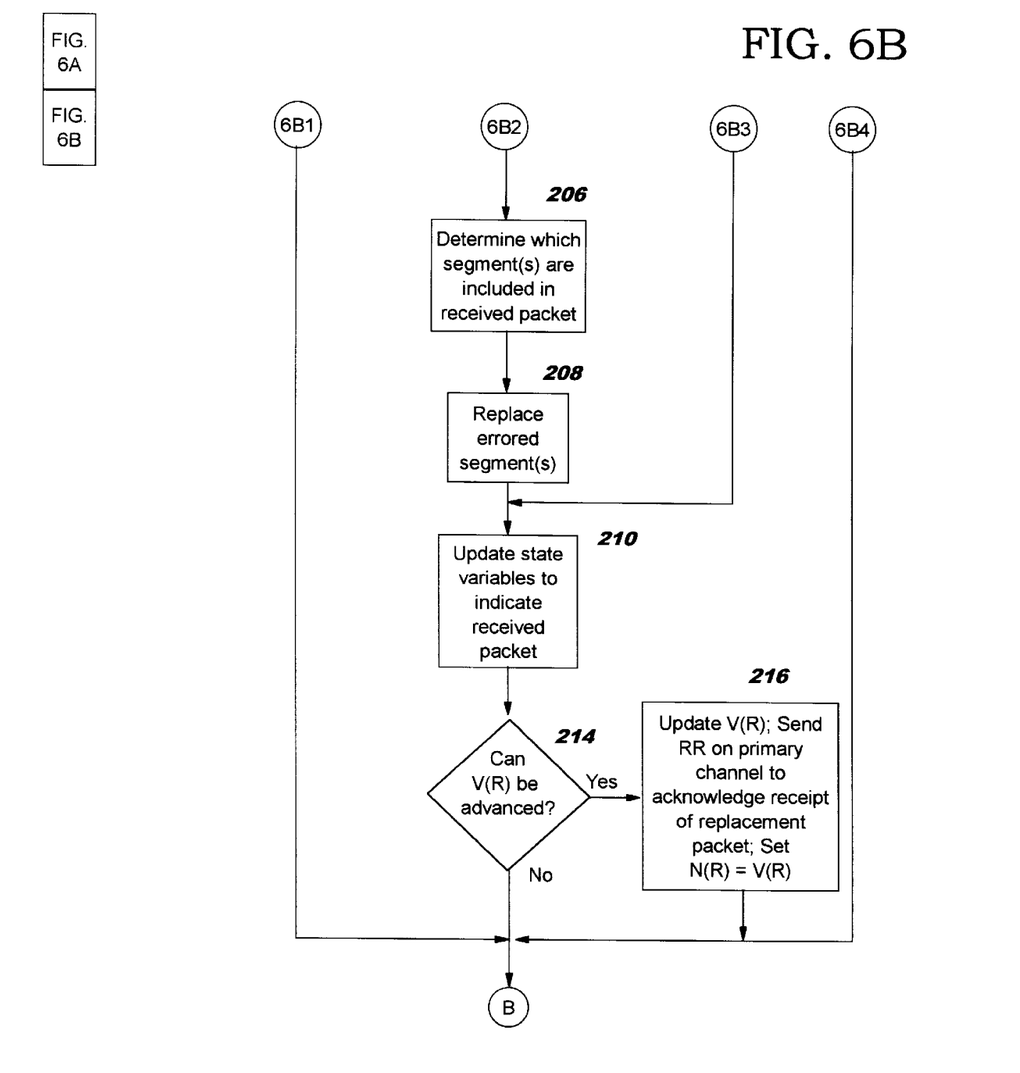

FIGS. 5 and 6 together depict a high-level flow chart illustrating a file transfer destination, such as second computer system 14, receiving data packets utilizing a first data link, data link 15, transmitting echo packets utilizing a second data link, data link 17, and receiving retransmitted packets and segment overlay packets on second data link 17, in accordance with the method and system of the present invention. The process starts as depicted at block 140 and thereafter passes to block 142 which illustrates a determination of whether or not second computer system 14 has received a packet transmitted utilizing the primary logical channel, first data link 15. If a determination is made that second computer system 14 has not received a packet transmitted utilizing the primary logical channel, the process passes to block 144. Referring again to block 142, if a determination is made that second computer system 14 has received a packet transmitted utilizing the primary logical channel, the process passes to block 146 which depicts the calculation of the standard CRC for the received packet as well as a CRC for each segment included within the packet. Next, block 148 illustrates the comparison of the standard CRC received with the packet and the calculated standard CRC.

Next, block 150, depicts a determination of whether or not the CRCs are the same. If a determination is made that the received and the calculated CRCs are different, the process passes to block 152 which illustrates a determination of whether or not this is an "I" packet. An "I" packet is a data packet. In addition to data packets, primary link 15 has supervisory packets, such as acknowledgement and busy indication packets, as well as unnumbered packets, such as break, link establishment, and link termination packets. A CRC echo packet is sent in response to receipt of only data packets. If a determination is made that this is not an I packet, the process passes to block 158 which depicts the discarding of the packet. The process then passes to block 144. Referring again to block 152, if a determination is made that this is an "I" packet, the process passes to block 154 which illustrates a determination of whether or not the packet size is valid. If a determination is made that the packet size is not valid, the process again passes to block 158. Referring again to block 154, if a determination is made that the packet size is valid, the process passes to block 156 which depicts the sending of a CRC echo packet on the secondary channel. The process then passes to block 144.

Referring again to block 150, if a determination is made that the CRCs are the same, the process passes to block 160 which depicts a determination of whether or not the received packet is valid. If a determination is made that the received packet is invalid, the process passes to block 162 which depicts the sending of a frame reject packet utilizing a primary logical channel, first data link 15. The process then passes to block 144.

Referring again to block 160, if a determination is made that the received packet is valid, the process passes to block 164 which illustrates a determination of whether or not the sequence number associated with the received packet, N(S), is the next expected number in the sequence. If a determination is made that the sequence number associated with the received packet is the next expected number in the sequence, the process passes to block 166 which depicts storing the packet, updating state variable to indicate this packet as received, and using normal acknowledgement procedures. The process then passes to block 144. Referring again to block 164, if a determination is made that the sequence number associated with the received packet is not the next expected number in the sequence, the process passes to block 168 which depicts the transmission of a selective reject packet utilizing the secondary channel to indicate a missing data packet. The process then passes to block 169 which depicts the storing of the received packet and the updating of the state variables to indicate that this packet has been received. The process then passes to block 144.

Referring again to block 144, a determination of whether or not the packet was received on the secondary logical channel, second data link 17, is illustrated. If a determination is made that no packet was received on the secondary logical channel, the process passes back to block 142. Referring again to block 144, if a determination is made that a packet was received on the secondary logical channel, the process passes to block 180 as illustrated through connector A. Block 180 depicts a determination of whether or not the CRC is good. If a determination is made that the CRC is not good, the process passes to block 182 which illustrates the discarding of the packet. The process then passes to block 142 as depicted through connector B.

Referring again to block 180, if a determination is made that the CRC is good, the process passes to block 184 which depicts a determination of whether or not the received packet is valid. If a determination is made that the received packet is not valid, the process passes to block 186 which depicts the sending of a frame reject packet utilizing the primary channel. The process then passes to block 142 as depicted through connector B. Referring again to block 184, if a determination is made that the packet is valid, the process passes to block 188 which illustrates a determination of whether or not the packet is a selective reject packet or a segment overlay packet. If a determination is made that the packet is a selective reject packet, the process passes to block 190 which illustrates a determination of whether or not the number, N(S), associated with the received packet is the next expected number in the sequence. If a determination is made that the N(S) associated with this packet is the next expected number in the sequence, the process passes to block 192 which depicts the resending of the previous CRC echo packet utilizing the secondary channel. The process then passes to block 142. Referring again to block 190, if a determination is made that the number, N(S), associated with this packet is not the next expected number in the sequence, the process passes to block 194 which illustrates the sending of one or more selective reject packets indicating which packets were missing on the secondary channel. The process then passes to block 192.

Referring again to block 188, if a determination is made that the packet is a segment overlay packet, the process then passes to block 196 which illustrates a determination of whether or not the packet is associated with a number, N(R), which is the same as the number N(S) associated with an echo packet previously transmitted by second computer system 14. If a determination is made that the number N(R) associated with the received packet is not the same as the number N(S) associated with an echo packet previously transmitted by second computer system 14, the process passes to block 198 which illustrates the sending of a frame reject packet utilizing the primary channel. The process then passes back to block 142.

Referring again to block 196, if a determination is made that the number N(R) is the same as the number N(S) associated with a previously transmitted echo packet, the process passes to block 200 which illustrates a determination of whether or not the number N(S) associated with the received packet is the next expected number in the sequence. If a determination is made that the number N(S) associated with the packet is not the next expected number in the sequence, the process passes to block 202 which illustrates the sending of a selective reject packet on the secondary channel. The process then passes to block 204. Referring again to block 200, if a determination is made that the number N(S) is the next expected number in the sequence, the process passes to block 204 which illustrates a determination of whether or not the received packet is the maximum size. If a determination is made that the received packet is not the maximum size, the process passes to block 206 which illustrates a determination of which segments are included in the received segment overlay packet utilizing bit-mapped mask field 72. Thereafter, block 208 depicts replacing only the segments which were in error. The process then passes back to block 210.

Referring again to block 204, if a determination is made that the received packet is the maximum size, the process passes to block 212 which depicts the replacement of the entire packet. The process then passes to block 210 which illustrates the updating of state variables to indicate a received packet. Thereafter, block 214 illustrates a determination of whether or not the V(R) can be advanced. The number V(R) indicates the most recently received packet sequence number N(S) for which all packets associated with earlier numbers in the sequence have been successfully received. If a determination is made that the V(R) cannot be advanced, the process passes back to block 142. Referring again to block 214, if a determination is made that the number V(R) can be advanced, the process passes to block 216 which illustrates the updating of V(R), the sending of a standard V.42 acknowledgement, Receive Ready (RR), on the primary channel to acknowledge receipt of the replacement packet, and the setting of N(R) equal to V(R). The process then passes to block 142.

It will be understood by those skilled in the art that if both data link 15 and second data link 17 operate in a full-duplex mode, bi-directional data transfer, each computer system 12 and 14 may simultaneously implement the actions depicted in the flow charts of FIGS. 4–6. Although use of the poll/final bit, and other control formats architected for V.42 is not described, it will be understood by those skilled in the art that other similar protocols could be created by manipulating these control formats which would still be within the scope of the present invention. Although the V.42 standard provides the basis for the preferred embodiment, the principles of the present invention could just as easily be applied to other error recovery protocols, such as MNP, ITU Q.921, Q.922, V.76, or other protocols.

While a preferred embodiment has been particularly shown and described, it will be understood by those skilled in the art that various changes in form and detail may be made therein without departing from the spirit and scope of the present invention.

What is claimed is:

1. A method in a data communications system having a first and a second computer system for retransmitting only a portion of a data packet which had been originally transmitted incorrectly, said method comprising the steps of:

establishing a single physical communication link between said first computer system and said second computer system;

said physical communication link including a first logical link and a second logical link, said first and second logical links being logically related so that said first and second logical links utilize a single set of sequence numbers;

transmitting a plurality of data packets from said first computer system to said second computer system utilizing said first logical link, each of said data packets including a plurality of segments;

determining if each of said plurality of data packets is received correctly;

in response to each determination that one of said plurality of data packets is not received correctly, determining a portion of said one of said plurality of data packets which was transmitted incorrectly; and said first computer system retransmitting only said portion of said one of said plurality of data packets utilizing said second logical link.

2. The method according to claim 1 further comprising the step of said second computer system transmitting an echo packet including an identification of said one of said plurality of packets and of each of said plurality of segments which was received incorrectly to said first computer system utilizing said second logical link, said identification of said one of said plurality of packets including a sequence number associated with said one of said plurality of packets.

3. The method according to claim 2 further comprising the step of said first computer system retransmitting a segment packet including only said each of said plurality of segments which were received incorrectly utilizing said second logical link in response to a receipt of said echo packet.

4. The method according to claim 3 wherein said step of determining if each of said plurality of segments included within said one of said plurality of data packets is received correctly further comprises the steps of:

prior to said first computer system transmitting said one of said plurality of packets, said first computer system determining a cyclical redundancy check for each of said plurality of segments;

said first computer system storing said cyclical redundancy check in a sequential order for each of said plurality of segments;

in response to said second computer system receiving said one of said plurality of packets, said second computer system determining a cyclical redundancy check for each of said plurality of segments included within each of said received plurality of data packets;

said second computer system transmitting each said cyclical redundancy check for each of said plurality of segments included within each of said received plurality of data packets to said first computer system in said echo packet; and said first computer system comparing said cyclical redundancy check included in said echo packet with said stored cyclical redundancy check for each of said plurality of segments.

5. The method according to claim 4 further comprising the step of in response to a determination that said cyclical redundancy check included within said echo packet is not the same as said stored cyclical redundancy check for one of said plurality of segments, retransmitting only said one of said plurality of segments.

6. The method according to claim 5 further comprising the steps of:

associating a unique one of said set of sequence numbers with each of said plurality of data packets and said echo packets; and transmitting each of said plurality of data packets and said echo packets with said associated one of said set of sequence numbers, wherein said first and said second logical links utilize the same set of sequence numbers.

7. A data communications system having a first and a second computer system for retransmitting only a portion of a data packet which had been originally transmitted incorrectly, comprising:

means for establishing a single physical communication link between said first computer system and said second computer system;

means for said physical communication link including a first logical link and a second logical link, said first and second logical links being logically related so that said first and second logical links utilize a single set of sequence numbers;

means responsive to said establishment of said first data link, for establishing a second data link between said first computer system and said second computer system, wherein said first and second data links are related;

means for transmitting a plurality of data packets from said first computer system to said second computer system utilizing said first logical link, each of said data packets including a plurality of segments;

means for determining if each of said plurality of data packets is received correctly;

means responsive to each determination that one of said plurality of data packets is not received correctly, for determining a portion of said one of said plurality of data packets which was transmitted incorrectly; and means for said first computer system retransmitting only said portion of said one of said plurality of data packets utilizing said second logical link.

8. The system according to claim 7 further comprising means for said second computer system transmitting an echo packet including an identification of said one of said plurality of packets and of each of said plurality of segments which was received incorrectly to said first computer system utilizing said second logical link, said identification of said one of said plurality of packets including a sequence number associated with said one of said plurality of packets.

9. The system according to claim 8 further comprising means for said first computer system retransmitting a segment packet including only said each of said plurality of segments which were received incorrectly utilizing said second logical link in response to a receipt of said echo packet.

10. The system according to claim 9 wherein said means for determining if each of said plurality of segments included within said one of said plurality of data packets is received correctly further comprises:

means for prior to said first computer system transmitting said one of said plurality of packets, for said first computer system determining cyclical redundancy check for each of said plurality of segments;

means for said first computer system storing said cyclical redundancy check in a sequential order for each of said plurality of segments;

means responsive to said second computer system receiving said one of said plurality of packets, for said second computer system determining a cyclical redundancy check for each of said plurality of segments included within each of said received plurality of data packets;

means for said second computer system transmitting each said cyclical redundancy check for each of said plurality of segments included within each of said received plurality of data packets to said first computer system in said echo packet; and means for said first computer system comparing said cyclical redundancy check included in said echo packet with said stored cyclical redundancy check for each of said plurality of segments.

11. The system according to claim 10 further comprising means responsive to a determination that said cyclical redundancy check included within said echo packet is not the same as said stored cyclical redundancy check for one of said plurality of segments, for retransmitting only said one of said plurality of segments.

12. The system according to claim 11 further comprising:

means for associating a unique one of a set of sequence numbers with each of said plurality of data packets and said echo packets; and means for transmitting each of said plurality of data packets and said echo packets with said associated one of said set of sequence numbers, wherein said first and said second logical links utilize the same set of sequence numbers.

13. A method in a data communications system having a first and a second computer system for retransmitting only a portion of a data packet which had been originally transmitted incorrectly, said method comprising the steps of:

establishing a single physical data link between said first computer system and said second computer system;

transmitting a plurality of data packets from said first computer system to said second computer system utilizing said physical data link, each of said data packets including a plurality of segments;

determining if each of said plurality of data packets is received correctly;

in response to each determination that one of said plurality of data packets is not received correctly, determining a portion of said one of said plurality of data packets which was transmitted incorrectly; and said first computer system retransmitting only said portion of said one of said plurality of data packets.

14. The method according to claim 13 further comprising the step of said second computer system transmitting an echo packet including an identification of each of said plurality of segments which was received incorrectly to said first computer system.

15. The method according to claim 14 further comprising the step of said first computer system retransmitting a segment packet including only said each of said plurality of segments which were received incorrectly in response to a receipt of said echo packet.

16. The method according to claim 15 wherein said step of determining if each of said plurality of segments included within said one of said plurality of data packets is received correctly further comprises the steps of:

prior to said first computer system transmitting said one of said plurality of packets, said first computer system determining an error detection identifier for each of said plurality of segments;

said first computer system storing said error detection identifier in a sequential order for each of said plurality of segments;

said second computer system determining an error detection identifier for each of said plurality of segments included within each of said received plurality of data packets;

said second computer system transmitting each said error detection identifier for each of said plurality of segments included within each of said received plurality of data packets to said first computer system in said echo packet; and said first computer system comparing said error detection identifier included in said echo packet with said stored error detection identifier for each of said plurality of segments.

17. The method according to claim 16 further comprising the step of in response to a determination that said error detection identifier included within said echo packet is not the same as said stored error detection identifier for one of said plurality of segments, retransmitting only said one of said plurality of segments.

18. The method according to claim 17 further comprising the steps of:

associating a unique one of a set of sequence numbers with each of said plurality of data packets and said echo packets; and transmitting each of said plurality of data packets and said echo packets with said associated one of said set of sequence numbers.

19. A data communications system having a first and a second computer system for retransmitting only a portion of a data packet which had been originally transmitted incorrectly, comprising:

means for establishing a single physical data link between said first computer system and said second computer system;

means for transmitting a plurality of data packets from said first computer system to said second computer system utilizing said physical data link, each of said data packets including a plurality of segments;

means for determining if each of said plurality of data packets is received correctly;

means responsive to each determination that one of said plurality of data packets is not received correctly, for determining a portion of said one of said plurality of data packets which was transmitted incorrectly; and means for said first computer system retransmitting only said portion of said one of said plurality of data packets.

20. The system according to claim 19 further comprising means for said second computer system transmitting an echo packet including an identification of each of said plurality of segments which was received incorrectly to said first computer system.

21. The system according to claim 20 further comprising means for said first computer system retransmitting a segment packet including only said each of said plurality of segments which were received incorrectly in response to a receipt of said echo packet.

22. The system according to claim 21 wherein said means for determining if each of said plurality of segments included within said one of said plurality of data packets is received correctly further comprises:

means prior to said first computer system transmitting said one of said plurality of packets, for said first computer system determining an error detection identifier for each of said plurality of segments;

means for said first computer system storing said error detection identifier in a sequential order for each of said plurality of segments;

means for said second computer system determining an error detection identifier for each of said plurality of segments included within each of said received plurality of data packets;

means for said second computer system transmitting each said error detection identifier for each of said plurality of segments included within each of said received plurality of data packets to said first computer system in said echo packet; and means for said first computer system comparing said error detection identifier included in said echo packet with said stored error detection identifier for each of said plurality of segments.

23. The system according to claim 22 further comprising means for in response to a determination that said error detection identifier included within said echo packet is not the same as said stored error detection identifier for one of said plurality of segments, retransmitting only said one of said plurality of segments.

24. The system according to claim 23 further comprising:

means for associating a unique one of a set of sequence numbers with each of said plurality of data packets and said echo packets; and means for transmitting each of said plurality of data packets and said echo packets with said associated one of said set of sequence numbers.

\* \* \* \* \*